United States Patent
Li et al.

(10) Patent No.: US 8,027,361 B2
(45) Date of Patent: Sep. 27, 2011

(54) CLASS-BASED BANDWIDTH ALLOCATION AND ADMISSION CONTROL FOR VIRTUAL PRIVATE NETWORKS WITH DIFFERENTIATED SERVICE

(75) Inventors: Xue Li, Aberdeen, NJ (US); Sanjoy Paul, Marlboro, NJ (US)

(73) Assignee: Alcatel Lucent, Paris (FR)

( * ) Notice: Subject to any disclaimer, the term of this patent is extended or adjusted under 35 U.S.C. 154(b) by 52 days.

(21) Appl. No.: 12/506,761

(22) Filed: Jul. 21, 2009

(65) Prior Publication Data
US 2009/0279568 A1    Nov. 12, 2009

Related U.S. Application Data

(63) Continuation of application No. 10/374,931, filed on Feb. 26, 2003, now Pat. No. 7,577,161.

(51) Int. Cl.
*H04J 3/16* (2006.01)
(52) U.S. Cl. .................... 370/468; 370/230; 370/395.21
(58) Field of Classification Search .................. 370/230, 370/395.21, 468, 229, 351
See application file for complete search history.

(56) References Cited

U.S. PATENT DOCUMENTS

| | | | | |
|---|---|---|---|---|
| 5,687,167 | A * | 11/1997 | Bertin et al. | 370/254 |
| 6,108,307 | A * | 8/2000 | McConnell et al. | 370/235 |
| 6,331,986 | B1 * | 12/2001 | Mitra et al. | 370/468 |
| 6,430,154 | B1 | 8/2002 | Hunt et al. | |
| 6,473,434 | B1 | 10/2002 | Araya et al. | |
| 6,816,903 | B1 | 11/2004 | Rakoshitz et al. | |
| 6,980,511 | B1 * | 12/2005 | Li et al. | 370/230 |
| 6,999,421 | B1 * | 2/2006 | Holzworth et al. | 370/235 |
| 7,106,756 | B1 | 9/2006 | Donovan et al. | |
| 7,184,398 | B2 | 2/2007 | McKinnon et al. | |
| 2002/0044553 | A1 * | 4/2002 | Chakravorty | 370/392 |
| 2002/0087713 | A1 | 7/2002 | Cunningham | |
| 2004/0006708 | A1 | 1/2004 | Mukherjee et al. | |
| 2004/0028054 | A1 * | 2/2004 | Khurana et al. | 370/395.21 |
| 2004/0085967 | A1 | 5/2004 | Boduch et al. | |
| 2004/0156367 | A1 | 8/2004 | Albuquerque et al. | |
| 2004/0168051 | A1 | 8/2004 | Guo et al. | |
| 2006/0140115 | A1 * | 6/2006 | Timus et al. | 370/230 |
| 2007/0294410 | A1 * | 12/2007 | Pandya et al. | 709/226 |

* cited by examiner

*Primary Examiner* — Kwang B Yao
*Assistant Examiner* — Nguyen Ngo
(74) *Attorney, Agent, or Firm* — Wall & Tong, LLP (57) ABSTRACT

A method and apparatus for establishing a virtual private network (VPN) session for a priority request. The method and apparatus includes identifying a priority request from a plurality of VPN session request classes. Reserved bandwidth is allocated to the priority request if a nominally allocated bandwidth is insufficient to satisfy the priority request. Once the allocated bandwidth is assigned, admission control is applied to the priority request.

10 Claims, 8 Drawing Sheets

CLASS-BASED BANDWIDTH ALLOCATION AND ADMISSION CONTROL FOR VIRTUAL PRIVATE NETWORKS WITH DIFFERENTIATED SERVICE

CROSS REFERENCE TO RELATED APPLICATIONS

This application is a continuation of U.S. patent application Ser. No. 10/374,931, filed Feb. 26, 2003 now U.S. Pat. No. 7,577,161, entitled CLASS-BASED BANDWIDTH ALLOCATION AND ADMISSION CONTROL FOR VIRTUAL PRIVATE NETWORKS WITH DIFFERENTIATED SERVICE, which application is incorporated herein by reference in its entirety.

FIELD OF INVENTION

The present invention relates to virtual private networks (VPN's). More specifically, the present invention relates to resource management and admission control of quality of service (QoS) VPN sessions.

DESCRIPTION OF THE BACKGROUND ART

Service providers currently offer value-added Virtual Private Network (VPN) services, which provide secure network connections among multiple sites of a corporation over a shared network infrastructure. QoS VPNs not only connect a company's multiple sites in a secure manner, but also provide different levels of QoS to different classes of traffic based on the corporation's needs. Such value-added services may include better quality of service (QoS) guarantees for VPN tunnels, service differentiation among users, among other services. All of these benefits come at the cost of trusting the service provider to maintain security associations with the end points.

Differentiated Services (DiffServ) is a framework that classifies traffic into different classes having different traffic priority levels. At the edge of service provider's core networks with DiffServ QoS provisioning, traffic is classified and aggregated into the various classes with different levels of QoS requirements. The objective is to maximize the service provider's profit by allocating resources and accepting VPN requests so as to achieve high network utilization, low call block rate (especially in high priority classes), and minimal Service Level Agreement (SLA) violations of existing VPN connections.

Packets belonging to different classes are marked with different DiffServ Code Points (DSCP). These markings are typically done at the egress router/switch of a customer's network, or at the ingress router/switch of a service provider's network. Based on the service level agreement (SLA) for different classes of traffic, metering and policing are conducted at the ingress router/switch of a service provider's network to make sure that traffic conforms to the SLA between the customer and the service provider. Packets with different DSCPs are put into different queues and receive a particular per-hop forward behavior (PHB) along the route.

The current industry approaches for class-based bandwidth allocation and admission control consists of static bandwidth allocation with parameter-based admission, and dynamic bandwidth allocation with parameter-based admission control. Static bandwidth allocation usually results in poor network utilization, as the incoming bandwidth requests in each class do not map to the a priori bandwidth allocation to each class. Alternatively, some classes have too many requests to fit in the pre-allocated bandwidth, while some other classes have too few requests and leave allocated bandwidth unused. Dynamical allocation allocates bandwidth "on-the-fly". Dynamic allocation improves network utilization, but may result in high call block rate in some high priority classes if their requests come after available bandwidth is allocated to low priority requests.

Given the bandwidth allocation scheme, an admission control algorithm is applied to decide whether a VPN request is accepted. There has been a lot of work on flow-based admission control in QoS networks (mostly with Integrated Services (IntServ)), but none provides a good solution for providing single-hop class-based bandwidth allocation and admission control in Diffserv networks. Those solutions are restricted to QoS services that provide per-flow assurance (e.g. IntServ), and do not address services that only give aggregated (per-class) service assurance, such as DiffServ, where no per-flow admission control is necessary. The input parameters to the admission control include: traffic and QoS parameters of a new request, load of accepted calls on the shared link, and available link bandwidth. The parameter-based admission control considers the worst-case scenario of incoming network traffic and results in low network utilization on the shared link.

SUMMARY OF THE INVENTION

A method and apparatus for establishing a virtual private network (VPN) session for a priority request. The method and apparatus include identifying a priority request from a plurality of VPN session request classes. Bandwidth is allocated for each traffic class with its incoming VPN requests. Reserved bandwidth is allocated to the high priority request if a nominally allocated bandwidth is insufficient to satisfy the priority request. After the bandwidth allocation, measurement-based admission control is applied to achieve higher admission ratio for certain priority class requests. After a VPN session is terminated, dynamic bandwidth reallocation is applied to relax over-loaded priority classes.

BRIEF DESCRIPTION OF THE DRAWINGS

The teachings of the present invention may be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The present invention provides virtual private network (VPN) services having value-added differentiated services (DiffServ). In particular, the differentiated services provide different levels of quality of service (QoS) to different classes of traffic. The present invention provides a dynamic bandwidth allocation scheme with advanced reservation, as well as measurement-based admission control for requests from high priority traffic classes.

Figure 1:
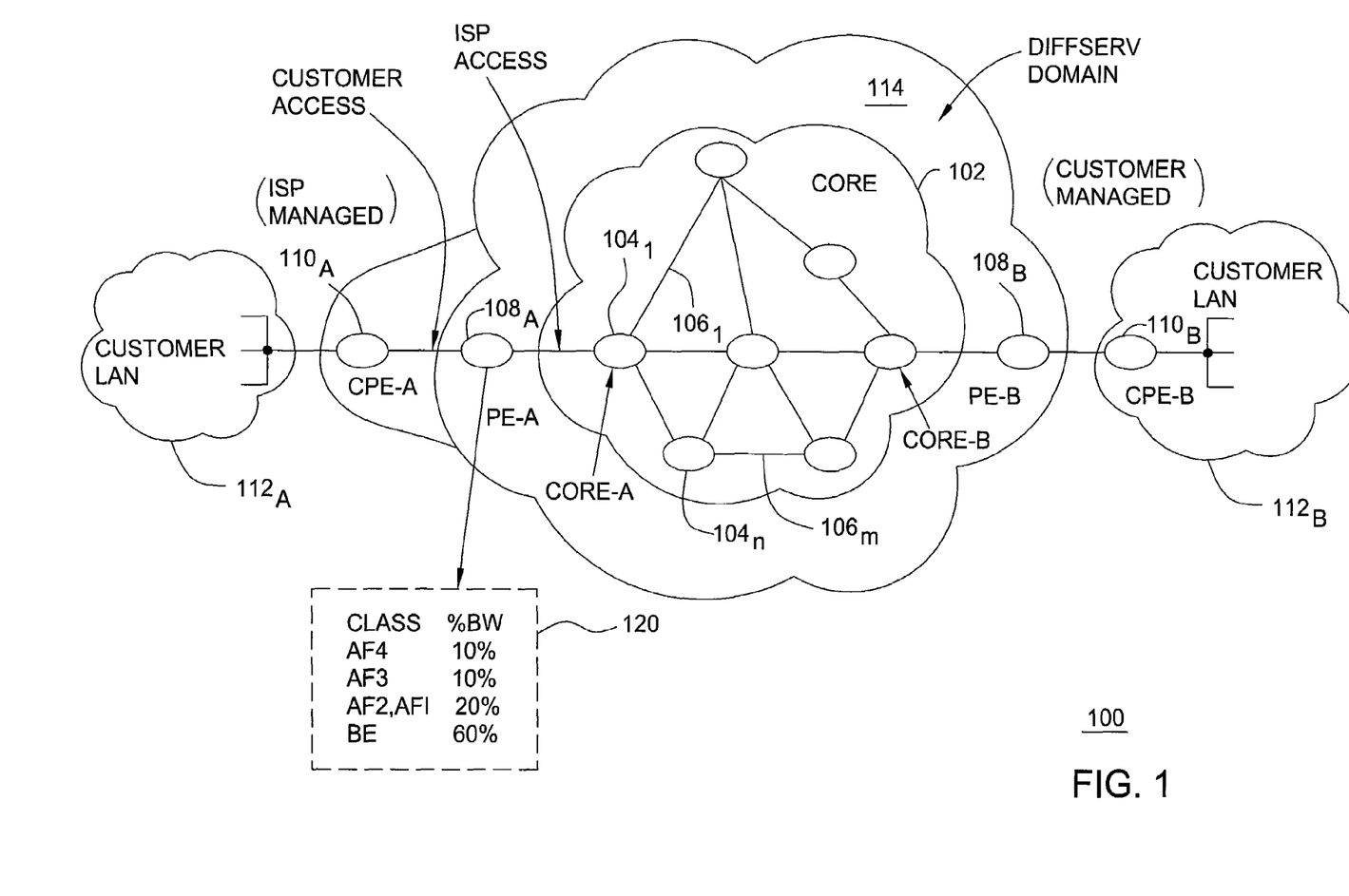
FIG. 1 depicts a schematic diagram of an exemplary service provider's network architecture for providing VPN services.

FIG. 1 depicts a schematic diagram of an exemplary service provider's network architecture 100 for providing VPN services. Specifically, the network 100 comprises a service provider network 114 and a plurality of enterprise intranets (i.e., customer networks) 112.

The service provider network 114 comprises service provider equipment (PE) including a core 102 having a plurality of nodes $104_n$ (e.g., routers and switches) interconnected via various links $106_m$. The network 100 is a packet network formed over a public IP network, such as the Internet. The service provider network 114 further comprises a plurality of provider edge nodes (e.g., routers) 108, which are VPN-aware routers that respectively interface with each of the customer networks 112. An edge node 108, such as an IP service gateway (IPSG), may be provisioned to serve a number of enterprise VPN customers each with a number of end users. For purposes of clarity, the term "customer" refers to enterprises, while the term "users" refers to end users of the enterprises. It is noted that the network 100 does not simply act as a conduit, but enables the VPN service. Moreover, the VPN routers 108 can enable other value-added services from the tunnel concatenation points, such as better QoS guarantees for VPN tunnels, service differentiation among users, among other services.

The customer networks 112 may include a local area network/wide area network (LAN/WAN) $112_A$ and $112_B$ forming an intranet having customer premise equipment (CPE) comprising a customer edge node (e.g., router) 110, switches, and user devices, such as servers, workstations, laptops, personal digital assistants (PDAs), among other devices. The customer edge nodes 110 are respectively coupled to the IPSGs 108 of the service provider 114.

In a network-based VPN model, a VPN is created by interconnecting customer premise equipment (CPE) of the enterprise to one or more IPSGs 108 provisioned for the customer. The data flows end-to-end through the concatenated tunnel via the ISPG 108. For example, referring to FIG. 1, a user accessing the customer LAN $112_A$ may establish a VPN session with a user located at LAN $112_B$. In particular, a user at a first customer LAN $112_A$ may establish a VPN session through an Internet Service Provider (ISP), which facilitates a customer edge router (CPE-A) $110_A$. The CPE-A $110_A$ is coupled to the core nodes 104 of the service provider via respective IPSG (PE-A) $108_A$. Secure packetized information is routed through the core nodes 104 and links 106 to an IPSG (PE-B) $108_B$ associated with a user at the customer LAN $112_B$. The IPSG $108_B$ routes the packetized information to the CPE-B $110_B$, where the CPE-B $110_B$ further routes the packetized information to a user located at the second customer LAN $112_B$.

It is noted that in a network-based VPN model, the network does not simply act as a conduit, but also enables the VPN service. Moreover, the IPSGs 108 can enable other value-added services from the tunnel concatenation points. Such value-added services may include better quality of service (QoS) guarantees for VPN tunnels, service differentiation among users, among other services. All of these benefits come at the cost of trusting the service provider to maintain security associations with the end points.

Figure 5A:
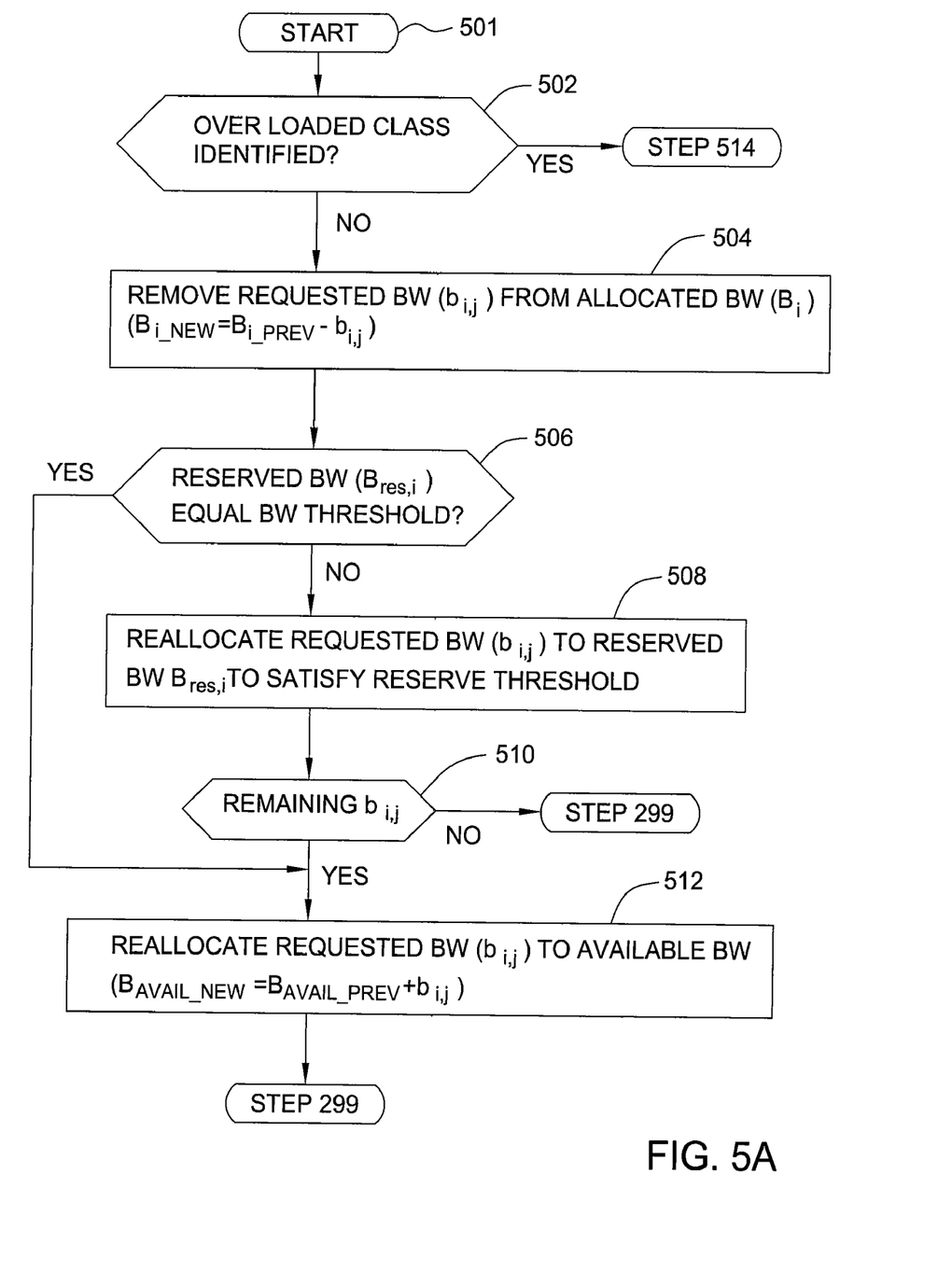
FIGS. 5A and 5B together depict a flow diagram of a method for reallocating bandwidth after VPN session termination.
Figure 5B:
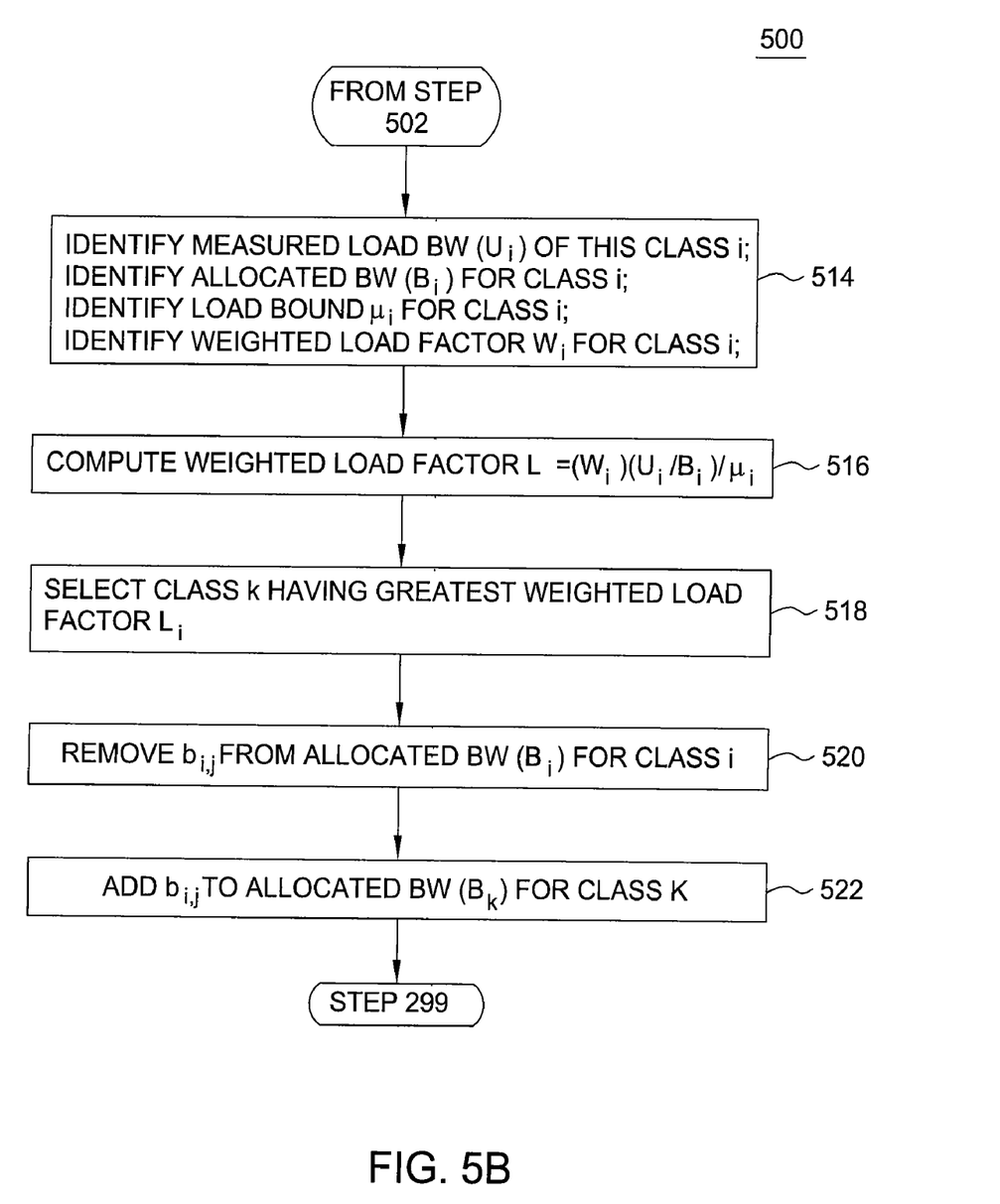
Figure 6:
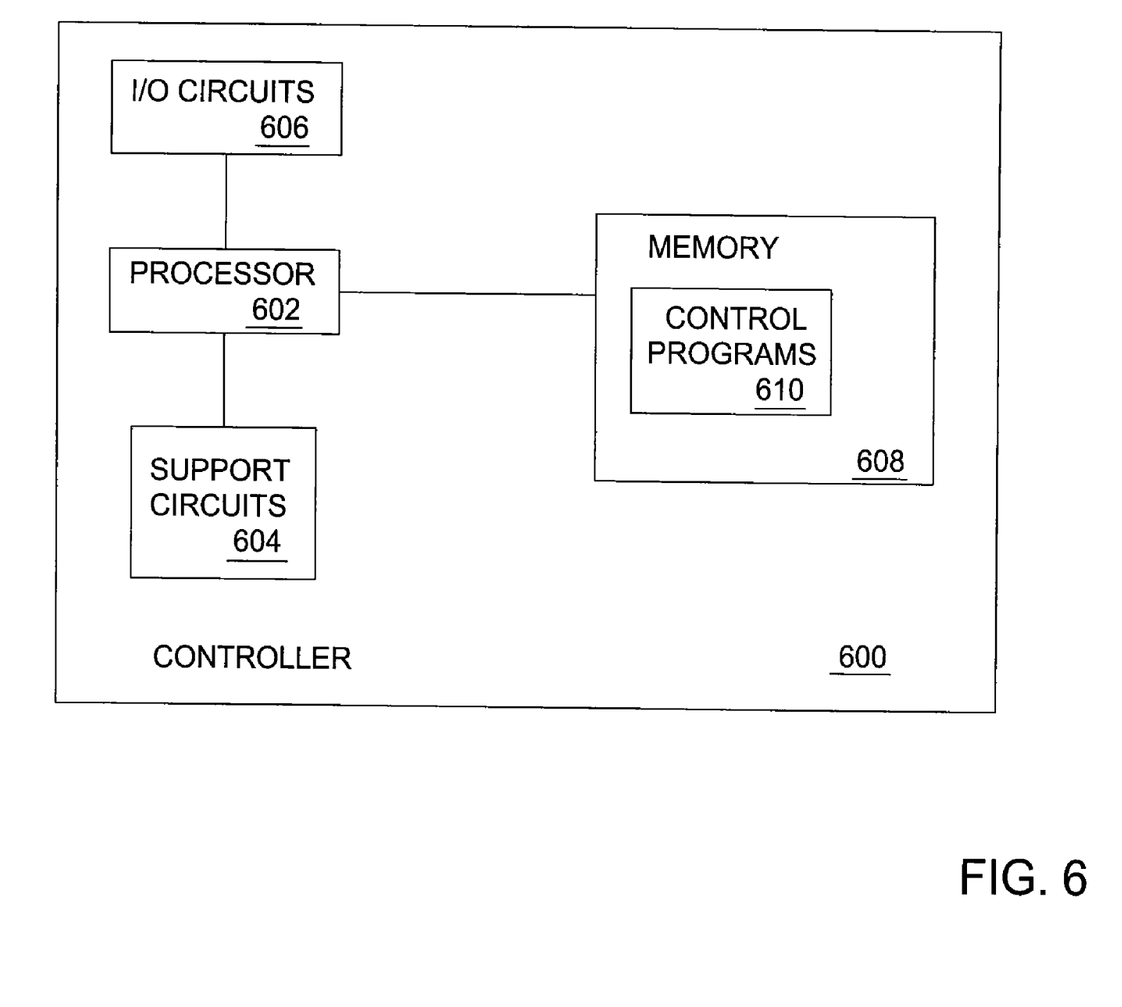
FIG. 6 depicts a high-level block diagram of a controller suitable for use in the network of FIG. 1.

FIG. 6 depicts a high-level block diagram of a controller 600 suitable for use in the network 100 of FIG. 1. The controller 600 may be implemented in the IPSGs 108 of the service provider 114, as well as other functional elements described herein with respect to the various figures. Specifically, the controller 600 of FIG. 6 comprises a processor 602, memory, 608, support circuits 604, and I/O circuitry 606. The memory 608 may include volatile memory, such as random access memory (RAM) as well as non-volatile memory, such as one or more disk drives. The memory 608 for storing various control programs 610, such as those depicted in method 200-500 of FIGS. 2-5. The processor 602 cooperates with the conventional support circuitry 604 such as power supplies, clock circuits, cache memory and the like, as well as circuits that assist in executing the software routines stored in the memory 608. The controller 600 also contains input/output (I/O) circuitry 606 that forms an interface between the various functional elements communicating with the controller 600.

Figure 2:
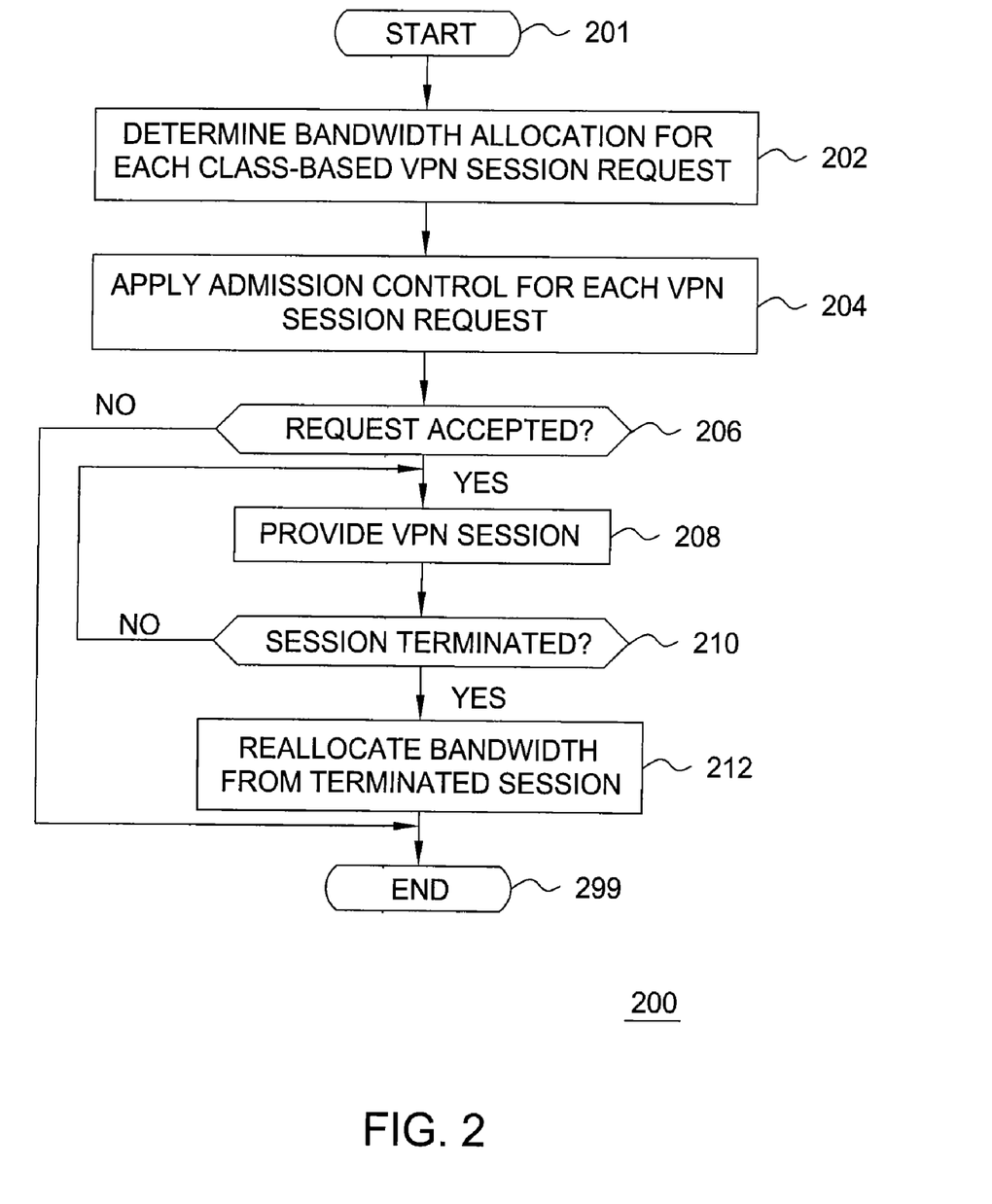
FIG. 2 depicts a flow diagram of a method for establishing a VPN session over the network of FIG. 1.

Although the controller 600 of FIG. 2 is depicted as a general-purpose computer that is programmed to perform various control functions in accordance with the present invention, the invention may be implemented in hardware as, for example, an application specific integrated circuit (ASIC) or as circuitry that cooperates with the processor 602 to perform various steps. As such, the process steps of the methods described herein are intended to be broadly interpreted as being equivalently performed by software, hardware, or a combination thereof.

The illustrative network of FIG. 1 shows the link bandwidth allocation (in percentage) among four assured forwarding (AF) classes (AF1 to AF4) and a best effort (BE) class. The IPSGs 108 provide link bandwidth allocation and admission control. The bandwidth may be allocated statically or dynamically. Typically, the first three DSCP bits are used to encode the following traffic classes (with priorities from the lowest to the highest): best effort (BE) class; assured forwarding (AF) classes for assured service, where AF1 signifies low priority, AF2 signifies medium priority, AF3 signifies high priority, AF4 signifies highest priority, and expedited forwarding (EF) class signifies premium service.

AF provides different levels of forwarding assurances for packets from a customer domain. Within each AF class, the two extra bits in DSCP may be used to encode DP (Drop Precedence) one to three. In case of congestion, a packet with a higher DP is dropped before a packet with a lower DP within the AF class. EF provides a low delay, low jitter and low loss service by ensuring that the aggregate traffic is serviced at certain configured rate.

FIG. 2 depicts a flow diagram of a method 200 for establishing a VPN session over the network of FIG. 1. The method 200 starts at step 201, and proceeds to step 202, where bandwidth allocation is determined for each class-based VPN session request. Specifically, the method 200 allocates the resources to provide the VPN session. An exemplary method 300 for allocating the bandwidth is discussed below with respect to FIGS. 3A and 3B. Once the bandwidth has been allocated for a VPN session, the method 200 proceeds to at step 400, where admission control is applied for each VPN session request.

Even though resources have been allocated at steps 202 and 204, a determination must be made as to whether a particular request for a VPN will be provided. At step 206, a determination is made at to whether the VPN session request has been accepted during the admission control of step 204. If accepted, then at step 208, the VPN session is provided. If denied, then the method 200 exits at step 299. An exemplary method 400 for applying admission control is discussed below with respect to FIG. 4.

At step 210, if the VPN session provided at step 208 is terminated, then the method 200 proceeds to step 212. The method 200 continues to provide the VPN session until such termination is determined at step 210. At step 212, the bandwidth from the terminated session is preferably reallocated. Reallocation of bandwidth is provided to help reduce congestion for other traffic classes, or for future allocation. An exemplary method 500 for reallocating bandwidth is discussed below in further detail with respect to FIGS. 5A and 5B.

Figure 3A:
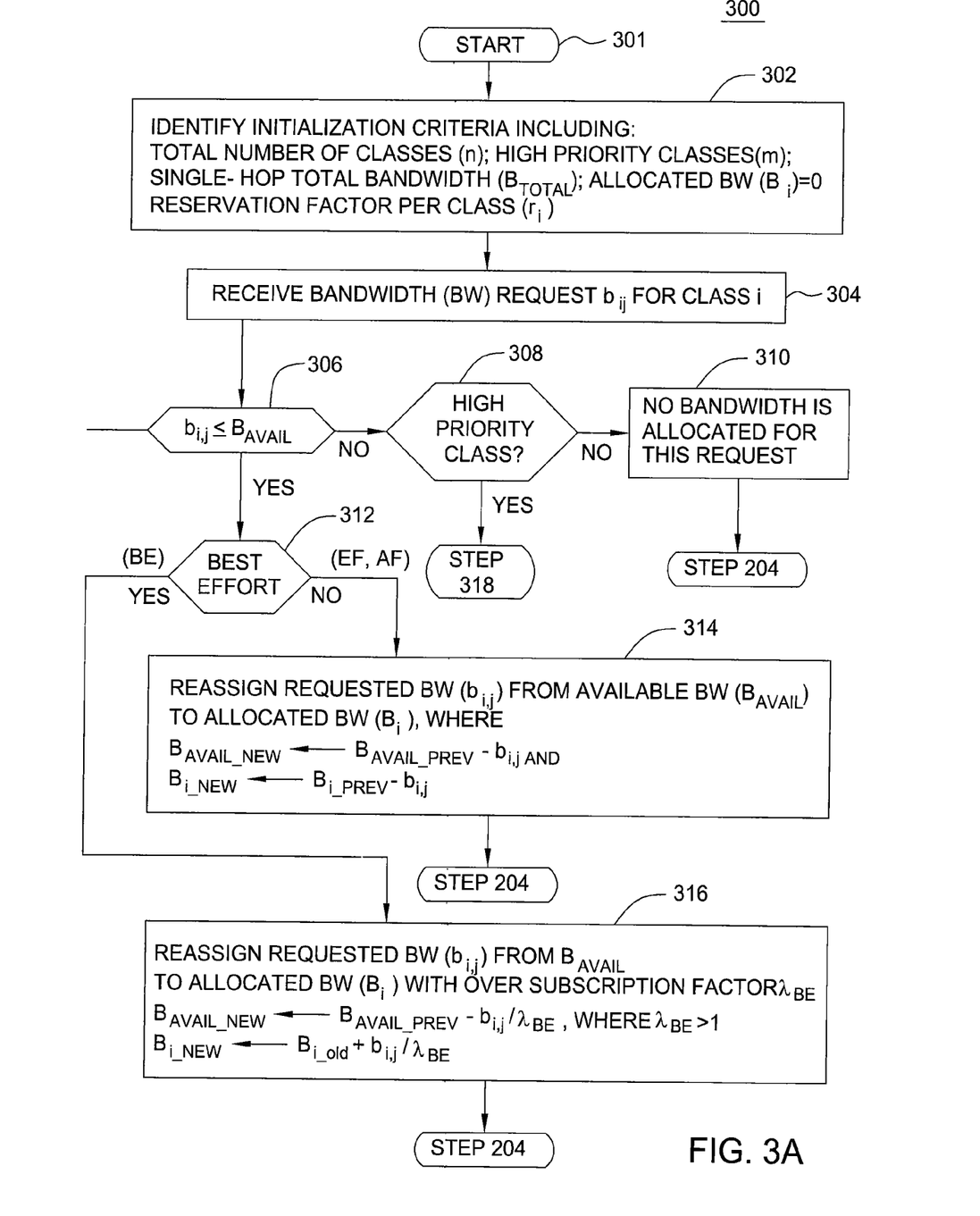
FIGS. 3A and 3B together depict a flow diagram of a method for determining bandwidth allocation for each VPN session request of a particular class.
Figure 3B:
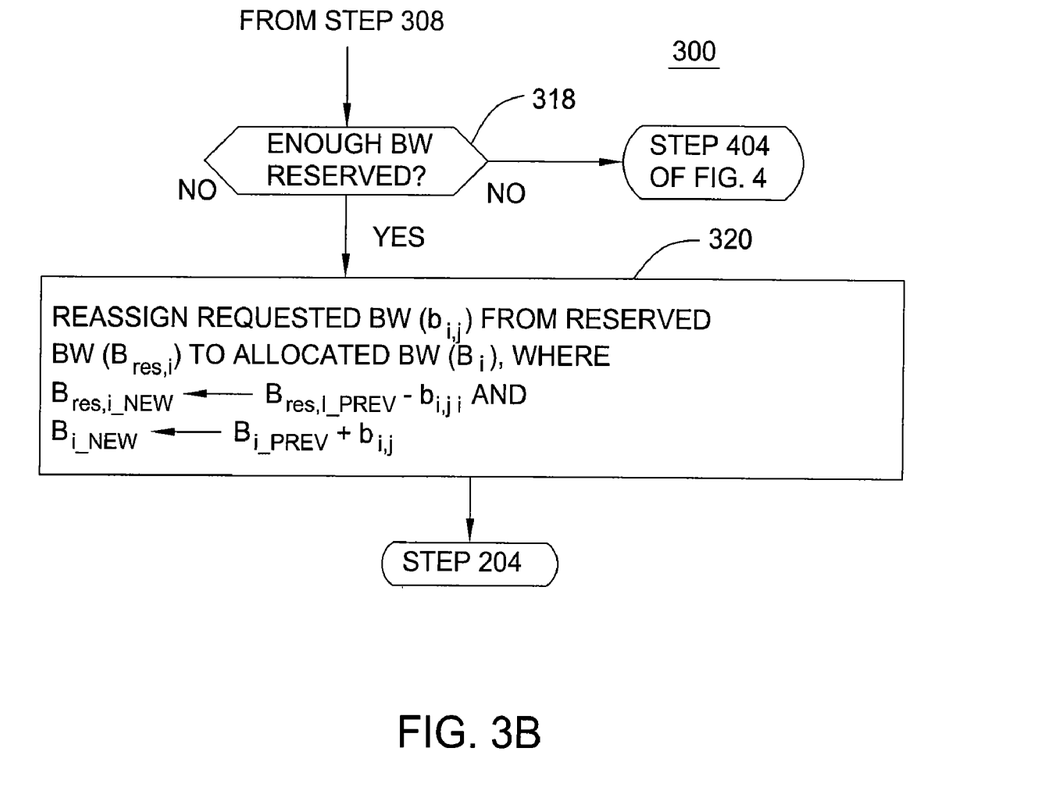

FIGS. 3A and 3B together depict a flow diagram of a method 300 for determining bandwidth allocation for each VPN session request of a particular class. Method 300 is suitable for use as step 202 in method 200 of FIG. 2. The method 300 is entered at step 301 and proceeds to step 302, where predefined network parameters and criteria are identified. Specifically, the total number of traffic classes "n" and priority classes "m" are identified, where $m \leq n$. Additionally, the total single-hop bandwidth $B_{total}$, the allocated bandwidth $B_i$ for each class i, and a reservation factor $r_i$ for each class i are also identified.

QoS VPN not only provides secured connections among multiple sites of a corporation over a publicly shared network infrastructure, but also provides different levels of QoS to different classes of traffic. It is noted that a QoS VPN request usually specifies two bandwidth requirement parameters. One parameter is a committed rate (CR), which is the bandwidth guaranteed to that customer for this VPN. It is also referred as minimum rate or allocated rate. A second parameter is a maximum rate, which is the maximum (peak) rate that the customer can use on this VPN.

For best effort VPN, the committed rate CR=0, and only the maximum rate MR is specified. That is, for a best effort VPN request, the bandwidth request $b_{BE}$ is set to MR. For assured forwarding AF classes, $MR \geq CR$, and the VPN bandwidth request parameter $b_{AF}$ is set to CR. For EF class: CR=MR, and the VPN bandwidth request parameter $b_{EF}$ is set to this value.

Two types of VPN connection requests from an enterprise client to the service provider are considered. Long-term VPN requests are those for regular VPN connections that carry the aggregated internal traffic among different sites of a company. They usually last a relative long period of time and allow longer setup time (compared with the on-the-fly requests).

On-the-fly VPN requests (i.e., short-term VPN requests) are usually for special inter-site networking applications that require extra bandwidth and/or higher level of quality of service. One example is high-quality remote video conferencing among several sites of a company. The on-the-fly VPNs usually last shorter time and allow shorter setup time as well. The service provider may charge a premium price for such value-added service.

There are three cases of over-subscription in the QoS VPN framework that which include customer over-subscription, best effort over-subscription, and line over-subscription. Customer over-subscription applies to the AF classes, where the maximum rate (MR) is greater than committed rate (CR). The difference (MR−CR) is defined as customer over-subscription. In order to conform to the service level agreements (SLA), over-subscribe policies include shaping, remarking packets to a lower class or to best effort, or dropping packets.

Best effort over-subscription applies to all best effort VPNs, where the requested bandwidth (which equals to MR) may be greater than the available bandwidth on the link, and may be expressed as $\Sigma b_{BE} = B_{BE} * \lambda_{BE}$, where $\lambda_{BE} \geq 1$. Here $B_{BE}$ is the allocated bandwidth for BE on the link, $b_{BE}$ is the request rate for each best effort request (and it is equal to the maximum rate), and $\lambda_{BE}$ is the over-subscription factor. When $\lambda_{BE} > 1$, best effort over-subscription is provided. This is common practice among service providers to over-subscribe best effort customers so as to achieve better network utilization. $\lambda_{BE}$ is usually much greater than 1.

Line Over-subscription applies to the AF classes. The actual bandwidth on an AF class VPN can be lower than its requested committed rate. Similar to best effort over subscription, a link may actually handle more AF VPNs than their total requested bandwidth allows, such that $\Sigma b_{AFx} = B_{AFx} * \lambda_{AFx}$, where $\lambda_{AF} \geq 1$.

Here $B_{AFx}$ represents the bandwidth allocated for class $AF_x$, $b_{AFx}$ represents the committed rate for each request, and $\lambda_{AFx}$ is the over-subscription factor. When $\lambda_{AFx} > 1$, line over-subscription is provided. Best effort over-subscription is actually a special case for line over-subscription. Best effort over-subscription is much more widely applied than AF class over-subscription and best effort over-subscription factor is much larger than AF class over-subscription factors.

For differentiated services, there are "n" classes marked by Diffserv DSCP bits. Best effort is the lowest priority class (e.g., "class 1"). The total bandwidth to be allocated is defined as $B_{total}$. The allocated bandwidth for class "i" is represented as $B_i$. Further, $B_{avail}$ represents the bandwidth not yet allocated, such that $$\sum_{i=1}^{n} B_i + B_{avail} = B_{total}.$$

For static bandwidth allocation, the total bandwidth $B_{total}$ may be statically allocated into "n" buckets (i.e., shares or portions) with bandwidth $B_i$. Each class i is allocated a share $C_i$ of the total bandwidth $B_{total}$. Accordingly, $B_i = B_{total} * C_i$, where $$\sum_{i=1}^{n} C_i = 1.$$

A VPN request is admitted if the request can still fit into the specific bucket for its class. An advantage of this static allocation scheme is its simplicity in implementation. However, if the class-based bandwidth allocation does not map to the VPN request distribution across these classes, the static bandwidth allocation may result in low network utilization (in those classes without enough requests to make use of the allocated bandwidth) and high call block rate (in those classes with too many requests to fit in the allocated bandwidth). Depending on the specific scenario of incoming VPN request patterns, the static allocation may also result in lower block rate for certain high priority classes compared with dynamic allocation.

To improve network utilization and reduce VPN request block rate, dynamic bandwidth allocation allocates bandwidth "on the fly". With an incoming request from class i, bandwidth is allocated to class i until the available bandwidth is depleted. Initially, for any class i, the allocated bandwidth $B_i = 0$, and the available bandwidth $$B_{avail} = B_{total} - \sum_{i=1}^{n} B_i$$
$$= B_{total}.$$

At step 304, an IPSG 108 (or controller 600) receives a bandwidth request "j" for class i, represented as "$b_{i,j}$" from a user requesting to initiate a VPN session. The method 300 then proceeds to step 306.

At step 306, if the requested bandwidth is less than or equal to the available bandwidth for a particular class ($b_{i,j} \leq B_{avail}$) and at step 312, the request $b_{i,j}$ not a best effort request (i>1), then the method 300 proceeds to step 314. At step 314, the new allocated bandwidth for that particular class ($B_{i\_new}$) equals the previous allocated bandwidth for that particular class ($B_{i\_previous}$) plus the requested bandwidth ($b_{i,j}$), such that $B_{i\_new} = B_{i\_previous} + b_{i,j}$. Here the requested bandwidth $b_{i,j}$ is the committed rate (CR) for the AF classes and maximum rate (MR) for the EF class. It is noted that for an EF class request, MR is equal to CR.

If at step 306, the requested bandwidth $b_{i,j}$ is less than the available bandwidth ($b_{i,j} \leq b_{avail}$), and at step 312, the bandwidth request $b_{i,j}$ is a best effort request (i=1), then the method 300 proceeds to step 316. At step 316, the requested bandwidth $b_{i,j}$ is reassigned from the available bandwidth $B_{avail}$ to the allocated bandwidth $B_i$, such that $B_{avail\_new} = B_{avail\_previous} - b_{i,j}$. Further, the new allocated bandwidth $B_{i\_new} = B_{i\_previous} + b_{i,j}/\lambda_{BE}$. Here $b_{i,j}$ is the maximum rate (MR, also known as peak rate) for the best effort request, and $\lambda_{BE}$ is the best effort over a subscription factor $\lambda_{BE}$, where $\lambda_{BE}$ is greater than 1.

If at step 306, the requested bandwidth is greater than the available bandwidth ($b_{i,j} > B_{avail}$), the system will not allocate bandwidth $b_{i,j}$ from $B_{avail}$ for class i. Whether this request is admitted or not, still depends on advanced bandwidth reservation and the admission control algorithm. Such a request may be admitted when there is enough bandwidth reserved for this class, or when line over-subscription is supported, as discussed below in further detail with respect to FIG. 3B and FIG. 4.

After a VPN session is terminated in step 210, if $b_{i,j}$ was allocated to class i for this request, then the requested bandwidth $b_{i,j}$ is deducted from $B_i$ as discussed in further detail below with respect to FIG. 5. Compared with static allocation, the improvements in dynamic inter-class bandwidth allocation include higher link utilization and lower VPN request call block rate.

The present invention enhances dynamic bandwidth allocation by providing dynamic bandwidth allocation with advance reservation. In particular, without the advanced reservation feature, future high priority class requests (e.g., high priority AF or EF VPNs) may be rejected if available bandwidth is already taken by lower priority requests (e.g., low priority AF VPNs) that come before the high priority requests. Accordingly, dynamic bandwidth allocation with advance reservation is provided for high priority requests of the present invention. Dynamic bandwidth allocation with advance reservation is useful in heavily loaded systems with a lot of on-the-fly priority requests that are short lived.

The allocation scheme is the same as dynamic bandwidth allocation except how $B_{avail}$ is set and how $B_{res,i}$ (reserved bandwidth for class i) is used. Advance reservation is only applied to the top priority classes, that is, class m to class n ($m \leq n$). In practice, only very few top classes (e.g. EF and AF4) make advance reservations, since there is added costs for providing priority level services. Initially, for any class i, the allocated bandwidth equals zero ($B_i=0$), while the available bandwidth equals the total bandwidth less the allocated bandwidth and less the reserved bandwidth, which may be expressed as:

$$B_{avail} = B_{total} - \sum_{i=1}^{n} B_i - \sum_{i=m}^{n} B_{res,i}.$$

Referring to FIG. 3, if at step 306, the requested bandwidth is greater than the available bandwidth ($b_{i,j} > B_{avail}$), and at step 308 the request is a priority request ($i \geq m$), and at step 318, the requested bandwidth is less than the reserved bandwidth ($b_{i,j} < B_{res,i}$), then the method 300 proceeds to step 320. At step 320, the requested bandwidth $b_{i,j}$ is reassigned from the reserved bandwidth $B_{res,i}$ to the allocated bandwidth $B_i$, such that $B_{i\_new} = B_{i\_previous} + b_{i,j}$, and $B_{res\_new,i} = B_{res\_previous,i} - b_{i,j}$. Accordingly, high priority classes take advantage of reserved bandwidth when the "available" bandwidth on the link is used up. Different reservation algorithms are discussed below in further detail.

If however, at step 306 the requested bandwidth is greater than the available bandwidth ($b_{i,j} > B_{avail}$), and at step 308 the request is not a priority request (i<m), then the method proceeds to step 310. At step 310, no bandwidth is allocated for this request, and the method 300 then proceeds to step 204.

Further, if at step 306 the requested bandwidth is greater than the available bandwidth ($b_{i,j} > B_{avail}$), and at step 308 the request is a high priority request ($i \geq m$), and at step 318 the requested bandwidth is less than the reserved bandwidth ($b_{i,j} > B_{res}$), then the method 300 can not further allocate bandwidth $b_{i,j}$ for class i. The method 300 then proceeds to step 404 of FIG. 4, where the admission control algorithm determines whether this request may be admitted. Such a request may be admitted in instances where line over-subscription is supported, which is discussed in further detail below.

For static reservation, a fixed portion of bandwidth $r_i$ is reserved for class i ($i \geq m$). Here $r_i$ is reservation factor for each class. It usually is set to be a very small ratio of the overall bandwidth. So, initially, $B_{res,i}$ is set a: $B_{res,i} = B_{total} * r_i$. After a VPN session is terminated, if $b_{i,j}$ was allocated to class i for this request, then $b_{i,j}$ is deducted from $B_i$, where $B_{i\_new} = B_{i\_previous} - b_{i,j}$.

If the reserved bandwidth of a class k ($B_{res},k$) is below its reservation factor $r_k$ (i.e. some of the reserved bandwidth for class k is already allocated to requests in this class), then the controller 600 makes use of the newly "available" bandwidth $b_{i,j}$ to make reservation for class k up to $r_k$. Specifically, if $B_{res,k} < B_{total} * r_k$, then $B_{res,k} = \min(B_{total} * r_k, B_{res,k} + b_{i,j})$.

If there is more than one class that needs to reserve bandwidth, the highest priority class reserves first. Compared with dynamic reservation, this greatly reduces the complexity in implementation.

Referring to FIG. 2, once the bandwidth allocation with advanced reservation has been established for a request for bandwidth, the method 200 proceeds to step 204, where admission control is applied for each VPN session request. Two admission control schemes may be applied with the inter-class bandwidth allocation discussed above. A first admission control technique includes parameter-based measurement admission control, while a second technique includes measurement-based admission control.

When a request comes in, if the bandwidth allocation is static, this request is checked against the allocated bandwidth of the class and current traffic load of the accepted VPNs in this class. With parameter-based admission control, the current load in a class depends on the traffic profiles (parameters) of accepted VPN requests. With measurement-based admission control, the current load in a class depends on the actual measured traffic of the existing VPNs in this class.

Alternatively, when a request comes in and the bandwidth allocation is dynamic, then if there is enough available bandwidth or enough reserved bandwidth to allocate to this class to accommodate this request, this request is admitted. If there is no longer available bandwidth to allocate to this class, this request is not necessarily rejected. Given the admission control schemes discussed below, this request may be admitted with statistical bandwidth multiplexing. With measurement-based admission control also discussed below, if there is still enough space between the measured aggregated bandwidth of the existing connections and the allocated bandwidth of this class, the request may be admitted.

Regarding parameter-based admission control, for request $b_{i,j}$ on class i, the request is admitted as long as the total bandwidth already requested plus this new request does not exceed the allocated bandwidth ($B_i$) of this class $$\sum_{k=1}^{j-1} B_{i,k} + b_{i,j} \leq B_i.$$

For EF classes, the request rate is maximum rate (MR), which also equals to its committed rate (CR). For AF classes though, the request rate is committed rate (CR), usually lower than its maximum rate (MR). For best effort class, usually no admission control is necessary. That is, the same admission principle may be applied together with best effort over-subscription, such that $$\sum_{k=1}^{j-1} B_{i,k} + b_{i,j} \leq B_i * \lambda,$$

where $\lambda \geq 1$, best effort over-subscription factor.

This is only one approach in parameter-based admission control. Parameter-based admission control is also known as "simple sum" algorithm. This is the simplest admission control algorithm and is most widely deployed in network switches and routers. Other techniques for parameter-based admission control include e.g. worst-case admission control among others, however they are not widely implemented in industry.

Figure 4:
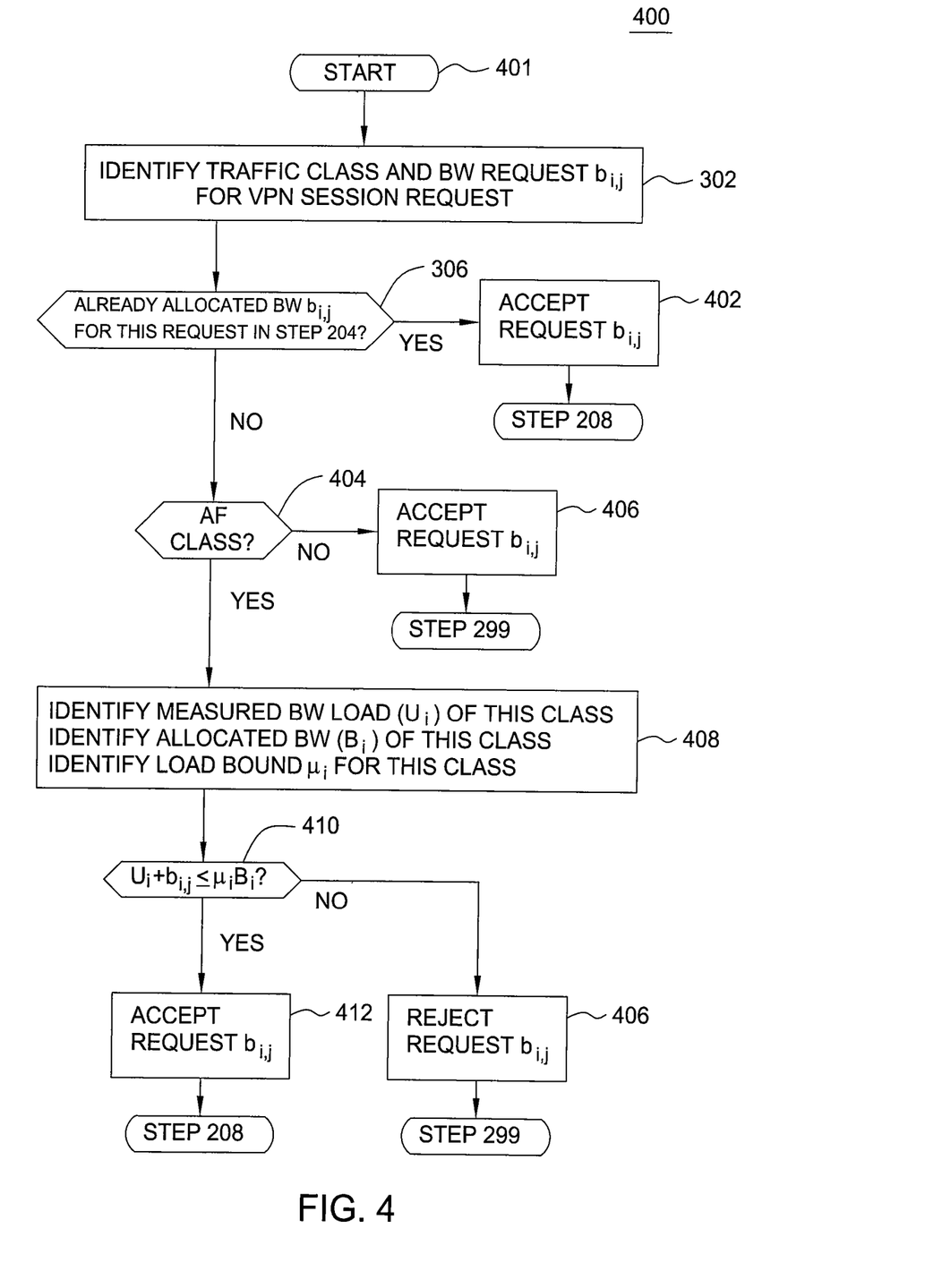
FIG. 4 depicts a flow diagram of a method for applying admission control for a VPN session request.

FIG. 4 depicts a flow diagram of a method 400 for applying measurement-based admission control for a VPN session request. Method 400 is suitable for use as step 204 in method 200 of FIG. 2. In particular, FIG. 4 is a method for applying measurement-based admission control, which includes an issue of delay-sensitive load bound (also know as utilization target) used in conjunction with measurement-based admission control.

The method 400 starts at step 401 and proceeds to step 302 where the traffic class is identified for the VPN request, as discussed above. At step 306, if bandwidth is already allocated for this request at step 204, then at step 402, the request $b_{i,j}$ is accepted. However, if at step 306 no bandwidth is allocated yet for this request at step 204, then at step 404, the method 400 determines if the request is an AF request. If the request is not an AF class request, then at step 406, the request $b_{i,j}$ is rejected, and the method 400 proceeds to step 299 of FIG. 2.

However, if at step 404, the request is an AF class request, then the method 400 proceeds to step 408, where the measured bandwidth load ($U_i$), the allocated bandwidth ($B_i$), and a load bound parameter $\mu_i$ for the priority class is identified.

For a given VPN request in class i, at step 410, a decision on the admission of this request depends on the measured traffic load in this class. For request $b_{i,j}$ of class i, the request will be admitted, at step 412, within the class as long as $b_{i,j}$ plus the measured total load $U_i$ of the existing VPN connections does not exceed a fraction ($\mu$) of $B_i$, where $U_i + b_{i,j} \leq \mu_i B_i$. Upon admitting request $b_{i,j}$, $U_{i\_new} = U_{i\_previous} + b_{i,j}$. Later, $U_i$ will be re-measured. This algorithm is also known as "measured sum". Otherwise, the method 400 proceeds to step 406, where the request $b_{i,j}$ is rejected.

Here $\mu$ is utilization target for class i, also known as per-class "load bound". In a simple M/M/1 queue, variance in queue length diverges as the system approaches full utilization. When the delay variation is very large, measurement-based admission control will fail, and this happens when the actual traffic load is very high in this class. Accordingly, $\mu$ is the utilization target that the system is trying to achieve, and it is also known as the load bound that the system tries to keep the traffic utilization under.

Typically, EF class requests do not apply measurement-based admission control due to the strict QoS requirements. In other words, for an EF class request, bandwidth allocation and request admission is typically guaranteed. Furthermore, best effort traffic usually does not need admission control, since best effort class is not a priority class. There are no bandwidth and admission guarantees, but rather, only a best effort to provide connectivity is made. Thus, measurement-based admission control is used in AF classes, to achieve higher network utilization.

Compared with parameter-based admission control, measurement-based admission control improves network utilization. Used together with dynamic bandwidth allocation, measurement-based admission control may still admit VPN connections for AF classes after the bandwidth allocation scheme can no longer explicitly allocate bandwidth for such requests. Compared with the current simple dynamic bandwidth allocation only approach in industry (which is the same as dynamic bandwidth allocation plus parameter-based allocation), the measurement-based admission control greatly enhances network utilization by supporting in-line over-subscription to admit more VPN requests for AF classes.

At step 210 of FIG. 2, after a VPN session is finished, any allocated bandwidth (if any bandwidth is allocated when the VPN session is admitted) is usually "returned" to "available bandwidth" to be allocated later by future requests. Alternatively, the allocated bandwidth may be reserved if advance-reservation is supported with dynamic bandwidth allocation.

FIGS. 5A and 5B together depict a flow diagram of a method 500 for reallocating bandwidth after VPN session termination. Method 500 is suitable for uses as step 212 in the method 200 of FIG. 2. Specifically, FIGS. 5A and 5B provide dynamic bandwidth reallocation with load bound. When measurement-based admission control is used, a VPN request may still be admitted after the bandwidth allocation scheme can no longer allocate bandwidth to its class. Such a class is termed an "over-subscribed" class. At step 502, the method 500 determines whether an overloaded class has been identified. If the query of step 502 is negatively answered, then the method 500 proceeds to steps 504 through 512. If the query of step 502 is positively answered, then the method 500 proceeds to steps 514 through 522.

For a non-oversubscribed class, at step 504, the requested bandwidth $b_{i,j}$ is removed from the allocated bandwidth $B_i$, where $B_{i\_new} = B_{i\_previous} - b_{i,j}$. At step 506, a query is made as to whether the reserved bandwidth for the particular class ($B_{res,i}$) associated with the terminated VPN session equals a predetermined bandwidth threshold. In other words, the predetermined amount of reserved bandwidth $B_{res,i}$ is maintained for the priority level classes. If the query of step 506 is answered negatively, then the requested bandwidth $b_{i,j}$ is reallocated to the reserved bandwidth $B_{res, i}$, to satisfy the reserved threshold requirements. That is, $B_{res\_I\_new} = B_{res, I\_previous} + Xb_{i,j}$, where $X \leq 1$. Each time a VPN session is terminated, the respective requested bandwidth $b_{i,j}$ is reallocated to the reserved bandwidth $B_{res}$, until the predetermined threshold requirement is satisfied.

If at step 510, there is any remaining requested bandwidth $b_{i,j}$ available for reallocation (i.e., the predetermined threshold requirement is satisfied, then at step 512, the remaining requested bandwidth $b_{i,j}$ is reallocated to the available bandwidth $B_{avail}$, where $B_{avail\_new} = B_{avail\_previous} + b_{i,j}$. The method 500 then proceeds to step 299, where the method 500 exits.

Alternatively, at steps 514 through 522, such "recaptured" bandwidth may be reallocated to an over-subscribed class (including the class where the bandwidth comes from) that is already heavily loaded. That is, there are classes that are heavily loaded due to accepting request under the measurement based admission control, such that the class is oversubscribed.

To judge if a class is heavily loaded, the simplest way is to look at its current traffic load $u_i$, where $u_i$ equals the ratio of the measured total load $U_i$ to the allocated bandwidth $B_i$ ($u_i = U_i/B_i$). A better metric is how close a particular classes' current traffic load $u_i$ is reaching the traffic bound $\mu_i$, which may be expressed as a weighted load factor: $l_i = w_i \mu_i / \mu_i$, where the weight $w_i$ depends on the priority of the class.

At step 514, the measured load $U_i$, the allocated bandwidth $b_i$, the load bound $\mu_i$, and the weighted load factor $w_i$ for class i are identified. At step 516, the weighted load factor $l_i = w_i u_i / \mu_i$ is computed. An over-loaded class with higher priority is more likely to get reallocated bandwidth. When a VPN session is finished and $b_{i,j}$ is the allocated bandwidth to class i for this VPN, then at step 518 a class k having the greatest weighted load factor $L_i$ is selected. In particular, an overloaded class k with the highest load factor over a certain threshold L gets the reallocated bandwidth from this VPN. Here the threshold L is necessary so as to make sure that bandwidth is reallocated only when a class is heavily loaded.

If there exists a class k, where the load factor of class k is less than or equal to the threshold ($l_k \leq L$) and for all classes x, $l_k \geq l_x$, then at step 520, the requested bandwidth $b_{i,j}$ is removed from the allocated bandwidth $B_i$, such that $B_{i\_new} = B_{i\_previous} - b_{i,j}$. Further, at step 522, the requested bandwidth $b_{i,j}$ is added to the allocated bandwidth $B_k$, such that $B_{k\_new} = B_{k\_previous} + b_{i,j}$. It is noted that where class i is the same as class k, then no action is required. Once the requested bandwidth from a terminated VPN session has been reallocated in step 5222 of FIG. 2, the method 500 proceeds to step 299 where the method 500 exits.

The present invention provides a method for inter-class bandwidth allocation and intra-class request admission control to support QoS VPN provisioning at the edge of core networks. Dynamic bandwidth allocation is enhanced with advanced resource reservation and measurement based admission control.

Further, dynamic bandwidth reallocation quickly relaxes the overloaded classes (as a result of measurement-based admission control) whenever possible so as to reduce the probability of QoS violations in those classes. Where bandwidth requests are from priority classes, the present invention provides a small amount of bandwidth reserved for such classes, which helps reduce priority call block rates and enhance the overall system performance. Further, dynamic bandwidth allocation out performs static allocation in achieving higher network utilization and lower VPN request block rate.

Admission control decides whether a request is admitted or not within a class (intra-class). Applying measurement-based admission control instead of parameter-based admission control improves network utilization for AF classes and allows for improved line over-subscription. Furthermore, once a VPN session has been terminated, the bandwidth from the terminated VPN session may be utilized to relieve other classes that are heavily loaded, due to over-subscription.

Although various embodiments that incorporate the teachings of the present invention have been shown and described in detail herein, those skilled in the art may readily devise many other varied embodiments that still incorporate these teachings.

What is claimed is:

1. A method for reallocating bandwidth for use in establishing virtual private network (VPN) sessions in a network supporting a plurality of VPN session request classes, comprising:

identifying termination of a VPN session having an allocated bandwidth associated therewith, wherein the identified VPN session is associated with one of the VPN session request classes;

computing, for each of at least one of the VPN session request classes, a respective weighted load factor indicative of whether a current traffic load of the VPN session request class is approaching a load bound parameter associated with the VPN session request class, wherein the weighted load factor associated with the VPN session request class is computed using the current traffic load of the VPN session request class, the load bound parameter associated with the VPN session request class; and a weight associated with the VPN session request class; and the current traffic load of the VPN session request class is computed using a measured bandwidth load of the VPN session request class, and an amount of bandwidth allocated for the VPN session request class; and determining, based on the at least one weighted load factor, whether to reallocate the allocated bandwidth of the terminated VPN session from the one of the VPN session request classes.

2. The method of claim 1, wherein the at least one of the VPN session request classes for which a respective weighted load factor is computed comprises each of the VPN session request classes identified as being oversubscribed.

3. The method of claim 1, wherein the at least one of the VPN session request classes for which a respective weighted load factor is computed comprises each of the plurality of VPN session request classes.

4. The method of claim 1, wherein, for each of the at least one VPN session request class for which a respective weighted load factor is computed, the weight associated with the VPN session request class depends on a priority level of the VPN session request class.

5. The method of claim 1, wherein, for each of the at least one VPN session request class (i) for which a respective weighted load factor is computed, the weighted load factor ($L_i$) associated with the VPN session request class is computed as:

$$L_i = (w_i)(u_i)/(\mu_i).$$

where $w_i$ is the weight;

$u_i$ is the current traffic load; and $\mu_i$ is the traffic (load) bound.

6. The method of claim 1, wherein, for each of the at least one VPN session request class for which a respective weighted load factor is computed, the current traffic load ($u_i$) of the VPN session request class is computed as:

$$u_i = U_i/B_i.$$

where: $U_i$ is the measured load bandwidth; and
$B_i$ is the allocated bandwidth.

7. The method of claim 1, further comprising:
in response to a determination to reallocate the allocated bandwidth of the terminated VPN session from the one of the VPN session request classes:
selecting at least one of the VPN session request classes based on the at least one weighted load factor computed for the respective at least one of the VPN session request classes; and
reallocating the allocated bandwidth of the terminated VPN session from the one of the VPN session request classes to the selected at least one of the VPN session request classes.

8. The method of claim 7, wherein the selected at least one of the VPN session request classes comprises the VPN session request class having the largest associated weighted load factor.

9. The method of claim 7, wherein the selected at least one of the VPN session request classes comprises at least one VPN session request class having a weighted load factor greater than a threshold.

10. An apparatus for reallocating bandwidth for use in establishing virtual private network (VPN) sessions in a network supporting a plurality of VPN session request classes, comprising:
means for identifying termination of a VPN session having an allocated bandwidth associated therewith, wherein the identified VPN session is associated with one of the VPN session request classes;
means for computing, for each of at least one of the VPN session request classes, a respective weighted load factor indicative of whether a current traffic load of the VPN session request class is approaching a load bound parameter associated with the VPN session request class; wherein
the weighted load factor associated with the VPN session request class is computed using the current traffic load of the VPN session request class, the load bound parameter associated with the VPN session request class; and a weight associated with the VPN session request class; and
the current traffic load of the VPN session request class is computed using a measured bandwidth load of the VPN session request class, and an amount of bandwidth allocated for the VPN session request class; and
means for determining, based on the at least one weighted load factor, whether to reallocate the allocated bandwidth of the terminated VPN session from the one of the VPN session request classes.

* * * * *